(12) United States Patent
Hu et al.

(10) Patent No.: US 10,877,826 B2
(45) Date of Patent: Dec. 29, 2020

(54) MESSAGE PROCESSING METHOD AND APPARATUS, STORAGE MEDIUM, AND COMPUTER DEVICE

(71) Applicant: TENCENT TECHNOLOGY (SHENZHEN) COMPANY LIMITED, Shenzhen (CN)

(72) Inventors: Hao Hu, Shenzhen (CN); Jisheng Huang, Shenzhen (CN); Haojun Hu, Shenzhen (CN); Chao Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/518,775

(22) Filed: Jul. 22, 2019

(65) Prior Publication Data

US 2019/0347146 A1 Nov. 14, 2019

Related U.S. Application Data

(63) Continuation of application No. PCT/CN2018/081663, filed on Apr. 3, 2018.

(30) Foreign Application Priority Data

May 11, 2017 (CN) .......................... 2017 1 0331416

(51) Int. Cl.
*G06F 3/00* (2006.01)
*G06F 9/54* (2006.01)
*G06F 9/445* (2018.01)

(52) U.S. Cl.
CPC .......... *G06F 9/546* (2013.01); *G06F 9/44526* (2013.01)

(58) Field of Classification Search
CPC ....................................................... G06F 9/54
(Continued)

(56) References Cited

U.S. PATENT DOCUMENTS 6,144,388 A * 11/2000 Bornstein ............... G06T 11/00
345/629
10,250,665 B2 * 4/2019 Kasatani ............... H04L 65/605
(Continued)

FOREIGN PATENT DOCUMENTS

| CN | 101360068 A | 2/2009 |
| CN | 101996095 A | 3/2011 |

(Continued)

OTHER PUBLICATIONS

Hang Li, MathJax's Realization via Computing Node and Server Configuration. (Year: 2012).*

(Continued)

*Primary Examiner* — Lechi Truong
(74) *Attorney, Agent, or Firm* — Morgan, Lewis & Bockius LLP

(57) ABSTRACT

A message processing method and apparatus, a storage medium, and a computer device are provided. The method can be applied to a computing device that executes a parent application and includes: receiving a session message; extracting a child application identifier in the session message; obtaining plug-in code corresponding to the child application identifier; and executing the plug-in code in an environment provided by a parent application. The method also includes obtaining, by executing the plug-in code, shared data corresponding to the child application identifier; and dynamically drawing, according to the shared data, a picture on a session interface corresponding to the session message.

20 Claims, 9 Drawing Sheets

(58) Field of Classification Search
USPC .......................................................... 719/310
See application file for complete search history.

(56) References Cited

U.S. PATENT DOCUMENTS

| | | | |
|---|---|---|---|
| 10,353,922 B1* | 7/2019 | Stolte | G06F 16/283 |
| 2003/0137691 A1* | 7/2003 | Tanaka | G06F 3/1289 |
| | | | 358/1.15 |
| 2004/0054740 A1 | 3/2004 | Daigle et al. | |
| 2009/0037544 A1 | 2/2009 | Wang et al. | |
| 2015/0288633 A1 | 10/2015 | Ogundokun et al. | |
| 2018/0032292 A1* | 2/2018 | Sasaki | G06F 3/1205 |
| 2019/0349411 A1 | 11/2019 | Luo et al. | |

FOREIGN PATENT DOCUMENTS

| | | |
|---|---|---|
| CN | 105490917 A | 4/2016 |
| CN | 106569900 A | 4/2017 |
| CN | 106598655 A | 4/2017 |
| CN | 107102880 A | 8/2017 |
| CN | 107229526 A | 10/2017 |
| WO | 2013172376 A1 | 11/2013 |
| WO | 2015162072 A2 | 10/2015 |

OTHER PUBLICATIONS

The World Intellectual Property Organization (WIPO) International Search Report for PCT/CN2018/081663 dated Jun. 21, 2018 5 Pages (including translation).
The State Intellectual Property Office of the People's Republic of China (SIPO) Office Action 1 for 201710331416.5 dated Jun. 1, 2018 7 Pages (including translation).
The European Patent Office (EPO) The Extended European Search Report for 18797808.5 dated Apr. 17, 2020 7 Pages.
The Japan Patent Office (JPO) Notification of Reasons for Refusal for Application No. 2019-546839 and Translation dated Oct. 6, 2020, 6 Pages.

* cited by examiner

MESSAGE PROCESSING METHOD AND APPARATUS, STORAGE MEDIUM, AND COMPUTER DEVICE

CROSS-REFERENCES TO RELATED APPLICATIONS

This application is a continuation application of PCT Patent Application No. PCT/CN2018/081663, filed on Apr. 3, 2018, which claims priority to Chinese Patent Application No. 201710331416.5, filed with the Chinese Patent Office on May 11, 2017 and entitled "MESSAGE PROCESSING METHOD AND APPARATUS, STORAGE MEDIUM, AND COMPUTER DEVICE", the entire contents of both of which are incorporated herein by reference.

FIELD OF TECHNOLOGY

This application relates to the field of computer technologies, and in particular, to a message processing method and apparatus, a storage medium, and a computer device.

BACKGROUND OF THE DISCLOSURE

An application is an encoded instruction sequence that may be performed by a terminal having an information processing capability, such as a computer, to obtain a result, or a symbolic instruction sequence or a symbolic statement sequence that may be automatically converted into an encoded instruction sequence. Currently, a user may install various applications on the terminal, for example, a photographing application, a social application, and a mail application, so that these applications installed on the terminal may be used to implement various functions, for example, a photographing function, a social function, and an email function management function.

In addition, after receiving a message related to an application, the user needs to switch to the application targeted by the message according to a user instruction, and process the message in the application.

SUMMARY

Embodiments of this application provide a message processing method and apparatus, a storage medium, and a computer device, to improve message processing efficiency.

One aspect of the present disclosure provides a message processing method. The method can be applied to a computing device that executes a parent application and includes: receiving a session message; extracting a child application identifier in the session message; obtaining plug-in code corresponding to the child application identifier; and executing the plug-in code in an environment provided by a parent application. The method also includes obtaining, by executing the plug-in code, shared data corresponding to the child application identifier; and dynamically drawing, according to the shared data, a picture on a session interface corresponding to the session message.

Another aspect of the present disclosure provides a message processing apparatus which includes a processor and a memory. The memory stores computer readable instructions, and the computer readable instructions can be executed by the processor to perform: receiving a session message; extracting a child application identifier in the session message; obtaining plug-in code corresponding to the child application identifier; and executing the plug-in code in an environment provided by a parent application. The processor is also configured to perform: obtaining, by executing the plug-in code, shared data corresponding to the child application identifier; and dynamically drawing, according to the shared data, a picture on a session interface corresponding to the session message.

Another aspect of the present disclosure provides a non-transitory computer readable storage medium that stores computer program instructions executable by at least one processor. The computer program instructions cause the at least one processor to perform receiving a session message; extracting a child application identifier in the session message; obtaining plug-in code corresponding to the child application identifier; and executing the plug-in code in an environment provided by a parent application. The computer program instructions also cause the at least one processor to perform: obtaining, by executing the plug-in code, shared data corresponding to the child application identifier; and dynamically drawing, according to the shared data, a picture on a session interface corresponding to the session message.

DESCRIPTION OF EMBODIMENTS

To make the objectives, the technical solutions, and the advantages of this application clearer, the following further describes this application in detail with reference to the accompanying drawings and the embodiments. It should be understood that the specific embodiments described herein are only used to describe this application, instead of limiting this application.

In some technologies, each time after receiving a message related to an application, a user needs to switch to the application targeted by the message, consuming a relatively long time, and causing relatively low message processing efficiency.

Based on this, an embodiment of this application provides a message processing method and apparatus, to improve message processing efficiency.

Figure 1:
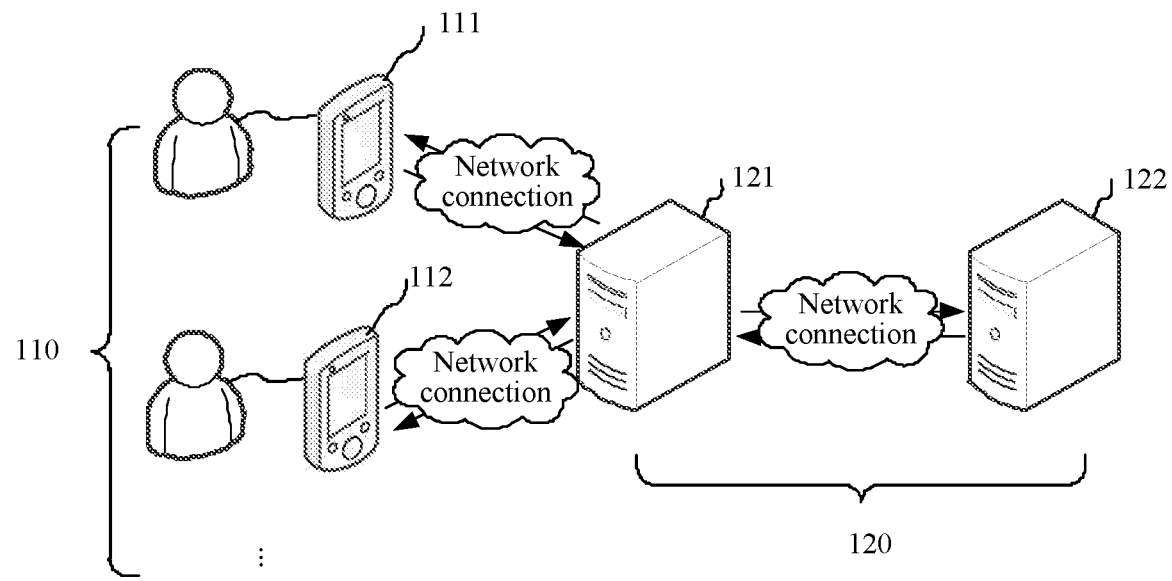
FIG. 1 is a diagram of an application environment of a message processing method according to an embodiment.

FIG. 1 is a diagram of an application environment of a message processing method according to an embodiment. Referring to FIG. 1, the message processing method is applied to a message processing system. The message processing system includes a terminal 110 and a server 120. The terminal 110 includes at least a first terminal 111 and a second terminal 112, and the server 120 includes at least a first server 121 and a second server 122. The terminal 110 is connected to the server 120 by using a network. A parent application run in an OS of the terminal 110 is configured to perform the message processing method. The terminal 110 may be specifically desktop terminals or mobile terminals, and the mobile terminal may be specifically at least one of a mobile phone, a tablet computer, a notebook computer, and the like. The server 120 may be specifically an independent physical server, or may be a physical server cluster. The server 120 may include an open service platform, or may include an access server for accessing an open service platform.

Figure 2:
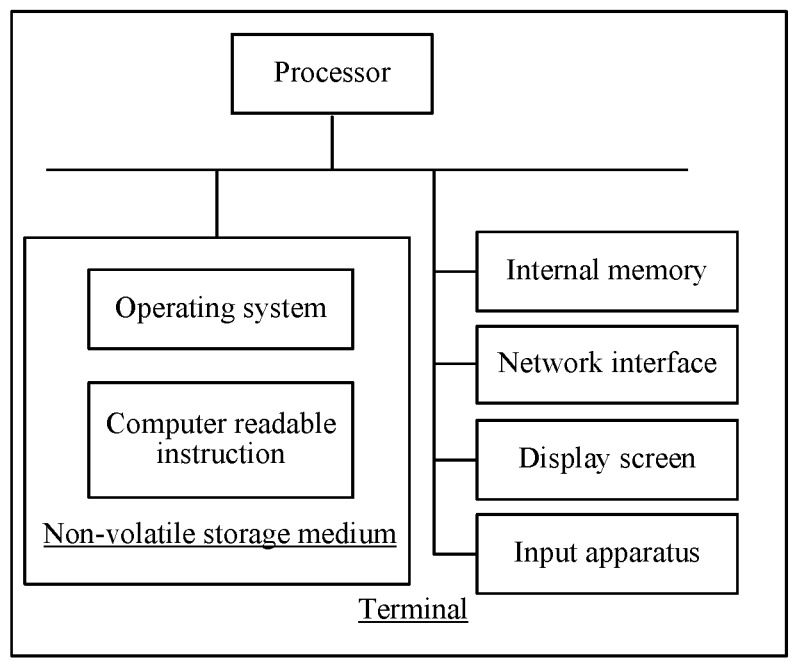
FIG. 2 is an internal schematic structural diagram of a terminal configured to implement a message processing method according to an embodiment.

FIG. 2 is a schematic diagram of an internal structure of a terminal according to an embodiment. As shown in FIG. 2, the terminal includes a processor, a non-volatile storage medium, an internal memory, a network interface, a display screen, and an input apparatus that are connected by using a system bus. The non-volatile storage medium of the computer device may store an OS and computer readable instructions. The computer readable instructions, when executed by the processor, may cause the processor to perform a message processing method. The processor is configured to provide computing and control capabilities and supports running of the entire terminal. The internal memory may also store computer readable instructions, and the computer readable instructions, when executed by the processor, may cause the processor to perform the message processing method. The network interface is configured to perform network communication with a server, for example, send a shared data obtaining request to a server, or receive shared data returned by a server. A display screen of the terminal may be a liquid crystal display screen, an electronic ink display screen, or the like. The input apparatus may be a touch layer covering the display screen, may be a key, a trackball, or a touchpad disposed on a terminal housing, or may be an extraneous keyboard, touchpad, mouse, or the like. The terminal may be a mobile phone, a tablet computer, a personal digital assistant, a wearable device, or the like. The structure shown in FIG. 2 is merely a block diagram of a partial structure related to a solution in this application, and does not constitute a limitation to the terminal to which the solution in this application is applied. Specifically, the terminal may include more components or fewer components than those shown in the figure, or some components may be combined, or a different component deployment may be used.

Figure 3:
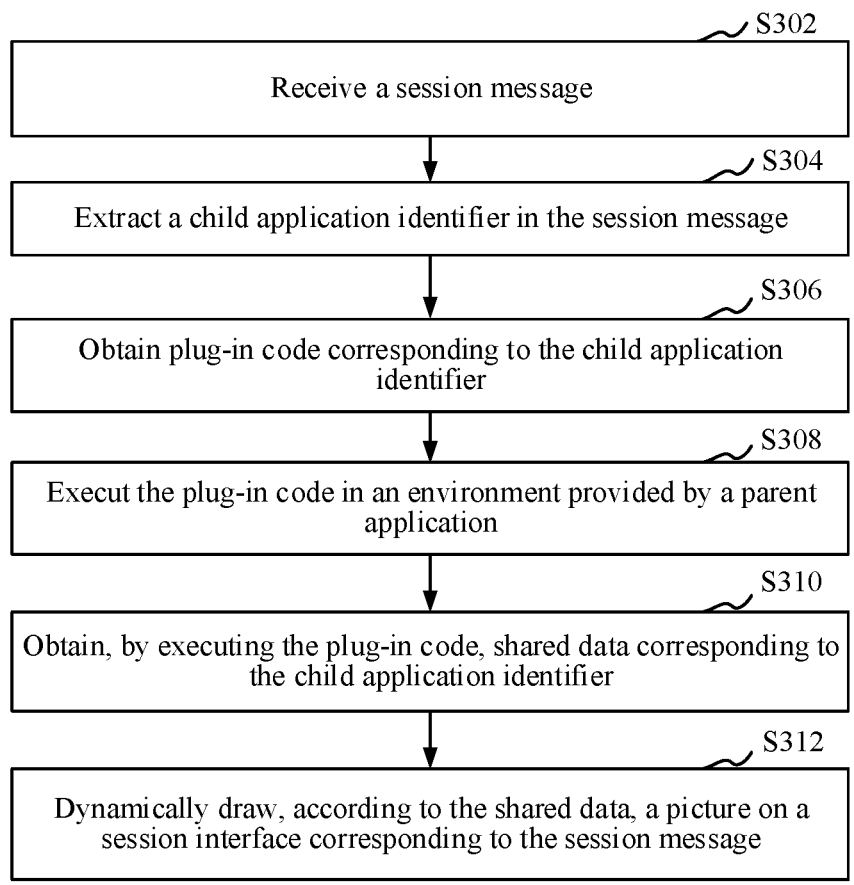
FIG. 3 is a schematic flowchart of a message processing method according to an embodiment.

FIG. 3 is a schematic flowchart of a message processing method according to an embodiment. In some embodiments, descriptions are provided mainly by using an example in which the method is applied to the terminal 110 in FIG. 1. The message processing method is performed by using a parent application executed on the terminal 110. Referring to FIG. 3, the method specifically includes the following steps:

S302: Receive a session message.

A session (e.g., a conversation/dialogue/chat session) is a process in which at least one user interacts with another user and may be facilitated by the parent application. The session message is a message initiated in the session, and may include a message initiated in the session by any user in the session.

In an embodiment, the terminal may establish, by using the parent application run on the terminal, a group used for performing a session (e.g., an instant messaging chat session). The group is a user set including more than one user identifier, and users identified by user identifiers in the group may perform information sharing and message exchange with each other based on the group. The group may be a chat group or a discussion group. The group may be a stable group that exists for a long time once being established, or may be a temporary group that is dismissed after a validity period expires.

In an embodiment, the session message may be a shared message, and shared data specified by the shared message may be text data, voice data, video data, image data, or the like. The shared data specified by the shared message may be dynamic data, or may be static data. The dynamic data may be continuously changing data, or may be periodically changing data.

Specifically, an OS is run on the terminal, and the parent application is run in the OS. The OS is a computer program managing and controlling hardware and software resources of the terminal, and is most basic system software directly run on a bare-metal terminal. An application needs to be run under the support of the OS. The OS may be a desktop OS such as the Windows OS, the Linux OS, or the Mac OS (an Apple desktop OS), or may be a mobile OS such as the iOS (an Apple mobile terminal OS) or the Android OS.

The parent application is a native application. The native application is an application that may be directly run on the OS (e.g., the OS of the terminal 110). The parent application may be a social application, a mail application, a game application, or the like. The social application includes an instant messaging (IM) application, a social network service (SNS), a live broadcast application, or the like. The parent application may be specifically a WeChat program.

S304: Extract a child application identifier in the session message.

The child application identifier is used to identify a corresponding child application. The child application identifier may be a character string that includes at least one type of character, including digit, letter, or symbol. The child application identifier may be specifically a unique identifier (AppID) of a child application.

In an embodiment, the terminal may directly detect, when receiving a session message by using a parent application, whether the session message includes a child application identifier, and extract a detected child application identifier when detecting that the session message includes the child application identifier. Alternatively, after receiving a session message, when displaying (e.g., by using a parent application), according to a received display instruction, a session interface corresponding to the session message, the terminal detects whether the session message includes a child application identifier, and extracts the detected child application identifier when detecting that the session message includes the child application identifier.

In an embodiment, when a child application is run in a parent application executed on the first terminal, the first terminal may share, by using a session message, a session performed in the parent application by the child application. After receiving the session message by using the parent application, the second terminal extracts a child application identifier in the session message. It may be understood that, the second terminal may also share, by using the session message, the child application in a session performed in the parent application, and the first terminal receives the session message by using the parent application. For example, the parent application is an IM app and the child application is a news applet embedded in the IM app. The first terminal may execute a news information viewing screen supported by the news applet in the IM app. The first terminal may receive a user instruction to share the currently viewed content to a certain contact (e.g., a share option is provided in the viewing screen interface). In response to the user instruction, an IM message containing related information (e.g., sender information, the identifier of the news applet, an identifier of the specific content, etc.) may be sent (e.g., forwarded by the IM server) to a second terminal corresponding to the selected contact. An IM interface of the parent application executed on the second terminal may present the IM message as a received message. Further, an IM interface of the parent application executed on the first terminal may present the IM message as a sent message.

The parent application is an application that carries the child application, and provides an environment for implementing the child application. The parent application is a native application. The native application is an application that may be directly run on the OS. The child application is an application that may be implemented in the environment provided by the parent application. The child application may be specifically a social application, a file management application, a mail application, a game application, or the like. The parent application may be specifically a WeChat program, and the corresponding child application may be referred to as an applet.

S306: Obtain plug-in code corresponding to the child application identifier.

The plug-in code is code used for defining a plug-in. The plug-in is independent of the child application, and is configured to carry data related to child application. Specifically, the child application may include a principal code bundle and a plug-in code bundle. The principal code bundle and the plug-in code bundle are independent of each other, and are associated with each other by using the child application identifier of the corresponding child application.

Figure 4:
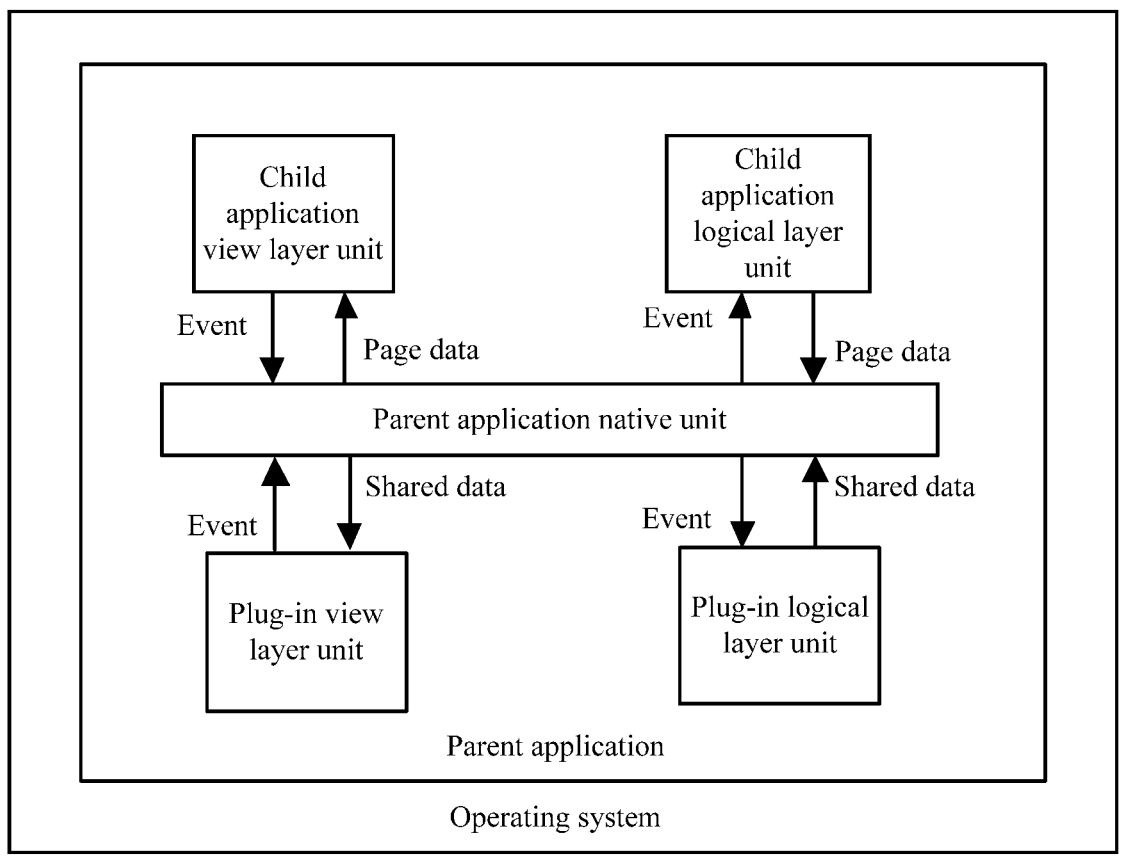
FIG. 4 is a schematic diagram of a relationship between an operating system (OS), a parent application, a child application, a page of the child application, and a plug-in and shared data corresponding to the child application according to an embodiment.

Referring to FIG. 4, an OS is run on the terminal, and a parent application is run in the OS, and the parent application provides a running environment to a child application. When the parent application is run in the OS of the terminal, a child application logical layer unit and a corresponding child application view layer unit that are used for implementing the child application may be created according to a code bundle of the child application. The child application logical layer unit may be configured to execute page logic code in the code bundle, and the child application view layer unit may be configured to execute page structure code in the code bundle, or execute page style code in the code bundle. The page logic code, the page structure code, and the page style code in the code bundle may be collectively referred to as page code.

The parent application run in the OS of the terminal may alternatively create, according to the plug-in code bundle of the child application, a plug-in logical layer unit and a corresponding plug-in view layer unit of a corresponding plug-in of the child application. The plug-in logical layer unit may be configured to execute plug-in logic code in the plug-in code bundle, and the plug-in view layer unit may be configured to execute plug-in structure code in the plug-in code bundle, or execute plug-in style code in the plug-in code bundle. The plug-in logic code, the plug-in structure code, and the plug-in style code in the plug-in code bundle may be collectively referred to as plug-in code.

The plug-in view layer unit is configured to organize rendering of a view and shared data of a plug-in. The plug-in logical layer unit is configured to process plug-in and shared data processing logic. A unit may be specifically a process or a thread. For example, the plug-in view layer unit is a plug-in view layer thread, and the plug-in logical layer unit is a plug-in logical layer thread. The plug-in logical layer unit may be run on a virtual machine. The plug-in view layer unit and the plug-in logical layer unit may perform transit communication by using a parent application native unit. The parent application native unit is an interface of communication between the parent application and the plug-in. The parent application native unit may be a thread or a process of the parent application.

In an embodiment, plug-in code corresponding to a child application identifier may be cached on the terminal. When extracting the child application identifier, the terminal may directly locally obtain plug-in code corresponding to the child application identifier. A download address of the plug-in code corresponding to the child application identifier may be alternatively cached on the terminal. When extracting the child application identifier, the terminal may locally obtain the download address of the plug-in code corresponding to the child application identifier, and identify corresponding server download plug-in code from the child application according to the download address.

In an embodiment, a session message received by the terminal by using a parent application may alternatively carry a download address of plug-in code corresponding to a child application identifier. When extracting the child application identifier by using the parent application, the terminal may extract, from the session message, the download address corresponding to the child application identifier, and then download the plug-in code from the child application identifier according to the download address.

S308: Run the plug-in code in an environment provided by a parent application.

In an embodiment, the terminal may create a plug-in logical layer unit and a corresponding plug-in view layer unit by using the parent application; and load plug-in code corresponding to an obtained child application identifier by using the plug-in logical layer unit, and instruct the plug-in view layer unit to perform rendering of a plug-in view interface. An environment in which the plug-in logical layer unit and the corresponding plug-in view layer unit created by using the parent application are run is an environment in which a plug-in corresponding to the obtained child application identifier is run.

S310: Obtain, by executing the plug-in code, shared data corresponding to the child application identifier.

The shared data is data used for being presented on the plug-in view interface. The shared data may be text data, voice data, video data, image data, or the like. The shared data may be dynamic data, or may be static data. The dynamic data may be continuously changing data, or may be periodically changing data.

In an embodiment, shared data corresponding to a child application identifier may be shared data uniformly set for a child application corresponding to the child application identifier. For example, shared data of a social application or a game application may be a promotion video that is uniformly set. The shared data corresponding to the child application identifier may be alternatively shared data of a particular page that belongs to the child application corresponding to the child application identifier, for example, page data of a page on which mail content in a mail application is located, or page data of a page on which weather information in a weather application is located.

In an embodiment, shared data corresponding to a child application identifier may be cached on the terminal, and plug-in code run in an environment provided by a parent application may directly locally obtain, from the terminal, the shared data corresponding to the child application identifier. The plug-in code run in the environment provided by the parent application may alternatively directly initiate a data request to a server corresponding to the child application identifier, and obtain, from the server corresponding to the child application identifier, the shared data corresponding to the child application identifier. The plug-in code run in the environment provided by the parent application may alternatively initiate a data request to a server corresponding to the parent application, and obtain, from the server corresponding to the parent application, the shared data corresponding to the child application identifier.

S312: Dynamically draw, according to the shared data, a picture on a session interface corresponding to the session message (e.g., the session interface provided by the parent application).

The session interface is a man-machine interface (e.g., graphical user interface) provided by an application having a session function. The picture is visible content presented on the session interface.

In an embodiment, after obtaining shared data, plug-in code run on the terminal may instruct the plug-in view layer unit to perform dynamic drawing on a plug-in view interface on a session interface based on the shared data.

In an embodiment, shared data obtained by plug-in code run on the terminal may be data that changes in real time. The plug-in code run on the terminal may instruct the plug-in view layer unit to perform drawing on a plug-in view interface on a session interface according to the shared data obtained in real time.

In an embodiment, shared data obtained by plug-in code run on the terminal may be shared data that is uniformly set. The shared data that is uniformly set may be specifically an image frame sequence. The plug-in code run on the terminal may instruct the plug-in view layer unit to display the received image frame sequence on a plug-in view interface on a session interface according to a time sequence and a frame rate frame by frame.

According to the foregoing message processing method, the parent application is run on the OS, and then the parent application may receive the session message, obtain, according to the child application identifier included in the session message, the plug-in code corresponding to the corresponding child application, then run the plug-in code in the environment provided by the parent application, obtain, by executing the plug-in code, the shared data corresponding to the child application identifier, and dynamically draw, based on the shared data, the picture on the session interface corresponding to the session message, to complete a message processing process. In this way, when being run, the parent application may directly process a received message in the environment provided by the parent application, avoiding time consuming caused by switching to an application, targeted by the message, to perform message processing, and improving message processing efficiency.

In an embodiment, step S310 includes: sending, by executing the plug-in code, a shared data obtaining request corresponding to the child application identifier to a first server corresponding to the parent application; and receiving the shared data that corresponds to the child application identifier and returned from the first server in response to the shared data obtaining request.

The shared data obtaining request is a request for requesting to obtain the shared data. Specifically, the parent application run on the terminal may generate, by executing the plug-in code, the shared data obtaining request corresponding to the child application identifier, and send the generated shared data obtaining request to the first server corresponding to the parent application, to obtain, from the first server, the shared data corresponding to the child application identifier.

In an embodiment, in the message processing method, the step of receiving the shared data that corresponds to the child application identifier and that is fed back by the first server in response to the shared data obtaining request includes: when valid shared data corresponding to the child application identifier is cached on the first server, receiving the cached shared data from the first server in response to the shared data obtaining request as the shared data corresponding to the child application identifier; or when no shared data corresponding to the child application identifier is cached on the first server, or when the cached shared data corresponding to the child application identifier becomes invalid, receiving the shared data corresponding to the child application identifier obtained by the first server from a second server corresponding to the child application identifier in response to the shared data obtaining request. In other words, in response to the shared data obtaining request, the first server first obtains the shared data from the second server and then sends the shared data to the user terminal.

Specifically, after obtaining the shared data each time according to the shared data obtaining request sent by the terminal, the first server corresponding to the parent application may store the obtained shared data and the shared data obtaining request in a corresponding manner, to read the shared data when the shared data is needed.

After receiving the shared data obtaining request sent by the terminal, the first server corresponding to the parent application may search a cache of the first server for a shared data obtaining request that matches the received shared data obtaining request. If finding the shared data obtaining request that matches the received shared data obtaining request, the first server obtains shared data having a correspondence with the found shared data obtaining request.

The first server may further detect whether a current time exceeds a caching time limit corresponding to the obtained shared data. The caching time limit refers to a validity period of the shared data. For example, the caching time limit is 10 minutes or one hour. Different shared data may correspond to a same caching time limit, or respectively correspond to different caching time limits.

When the current time does not exceed the caching time limit corresponding to the obtained shared data, it indicates that the shared data stored on the first server is valid shared data, and the first server may directly feed back the found shared data to the terminal. When the current time exceeds the caching time limit corresponding to the obtained shared data, it indicates that the shared data stored on the first server becomes invalid, and the first server may determine a child application identifier to which the received shared data obtaining request points, and establish a connection to a second server corresponding to the child application identifier, to detect whether the shared data cached on the first server is consistent with the corresponding shared data on the second server.

If the shared data cached on the first server is consistent with the corresponding shared data on the second server, it indicates that the shared data stored on the first server does not change, and the first server may directly feed back the found shared data to the terminal. If the shared data cached on the first server is inconsistent with the corresponding shared data on the second server, it indicates that the shared data stored on the first server has changed, and then the shared data on the first server is updated according to the corresponding shared data stored on the second server. The first server further feeds back the updated shared data to the terminal.

In some embodiments, the shared data is cached by using the first server corresponding to the parent application. When needing to obtain the shared data corresponding to the child application identifier, the terminal may directly obtain the cached data to perform feedback, avoiding resource waste caused by frequent requests for same data. In addition, validity determining is set for the cached shared data, ensuring time validity of the cached shared data.

In the foregoing embodiment, when the shared data corresponding to the child application identifier needs to be obtained, the first server corresponding to the parent application is used as transition, the shared data obtaining request is sent to the first server, and the first server responds to the request, avoiding that the second server corresponding to the child application identifier simultaneously receives a large quantity of shared data obtaining requests, causing a problem that responding is incorrect or responding cannot be performed.

Figure 5:
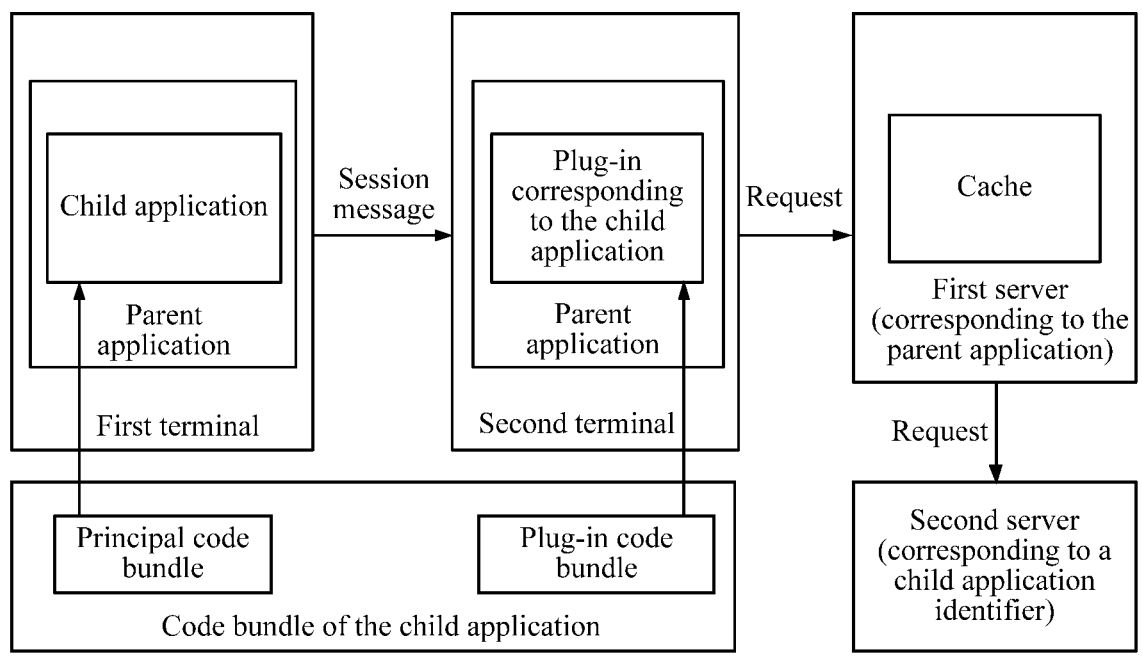
FIG. 5 is an architectural diagram of implementing a shared data obtaining process according to an embodiment.

FIG. 5 is an architectural diagram of implementing a shared data obtaining process according to an embodiment. Referring to FIG. 5, a child application includes a principal code bundle and a plug-in code bundle. A parent application is run on a first terminal, and a session established in the parent application is participated in by using a user identifier. The first terminal may run, in a running environment provided by the parent application, the child application by running a principal code bundle of the child application, and initiate, in the session established in the parent application, a session message to share the child application.

After receiving the session message by using the parent application, a second terminal runs, in the running environment provided by the parent application, the plug-in code bundle of the child application, and sends, by using plug-in code that is run, a shared data obtaining request corresponding to a child application identifier to a first server corresponding to the parent application.

In response to the shared data obtaining request, the first server searches a cache of the first server for shared data corresponding to the child application identifier. If finding valid shared data corresponding to the child application identifier in the cache, the first server feeds back the shared data to the second terminal. If finding no shared data corresponding to the child application identifier in the cache, or the found shared data corresponding to the child application identifier becomes invalid, the first server forwards the shared data obtaining request to a second server corresponding to the child application identifier.

In response to the shared data obtaining request, the second server feeds back the valid shared data corresponding to the child application identifier to the first server, and then the first server feeds back the shared data to the terminal.

In an embodiment, step S310 includes: determining, by executing the plug-in code, a target shared page specified by the session message, where the target shared page belongs to a child application corresponding to the child application identifier; and obtaining, by executing the plug-in code, shared data corresponding to the target shared page. In some embodiments, the obtained shared data corresponding to the target shared page is used as the shared data corresponding to the child application identifier.

The target shared page is a page that is intended to be shared and that belongs to the child application. Specifically, when running the child application in the environment provided by the parent application, the first terminal initiating the session message may share any page that belongs to the child application. When sharing, by initiating a session message, a particular page that belongs to the child application, the first terminal may add a page path and a page parameter of the page to the session message.

In an embodiment, the target shared page may be a page displayed on the terminal by the child application that is run, or may be a partial page of a page that is displayed. For example, when the child application is a mail application, all content of a mail displayed on the terminal by the mail application includes a mail subject, a mail text, a receiver, a sender, and the like. The target shared page may be a currently displayed page, and includes all the content of the main. The target shared page may be alternatively a partial page of a currently displayed page, and includes only the mail text.

In an embodiment, in the message processing method, the determining, by executing the plug-in code, a target shared page specified by the session message includes: extracting a page path and a page parameter in the session message by executing the plug-in code; and determining, according to the page path and the page parameter, the target shared page specified by the session message.

The page path may be specifically a path on a server or a local path, and may be an absolute or a relative page path. The page parameter is a parameter used for describing page content.

Specifically, the page path and the page parameter conform to particular data formats. The terminal detects the session message by using plug-in code that is run, and extracts, from the session message, data that conforms to the data format corresponding to the page path, to obtain the page path; and extracts, from the session message, data that conforms to the data format corresponding to the page parameter, to obtain the page parameter. The terminal may further locate, according to the extracted page path and page parameter by executing the plug-in code, a corresponding target shared page that belongs to the child application corresponding to the child application identifier.

In some embodiments, the target shared page needing to be shared may be accurately located by adding the page path and the page parameter to the session message, to accurately share content intended to be shared.

In an embodiment, after locating the target shared page by using the parent application, the terminal may obtain a download address of page data included in the target shared page, and download, according to the download address, the page data included in the target shared page, to obtain the shared data corresponding to the target shared page.

In the foregoing embodiment, the page belonging to the child application may be shared, improving diversity and flexibility of content to be shared.

In an embodiment, step S312 includes: invoking, by executing the plug-in code, a drawing interface provided by the parent application to draw the picture on the session interface corresponding to the session message.

Specifically, the drawing interface provided by the parent application may be encapsulation of a drawing interface provided by the OS, and one drawing interface provided by the parent application may be encapsulation of one or more drawing interfaces provided by the OS. The terminal invokes, by executing the plug-in code, the drawing interface provided by the parent application, then invokes the drawing interface provided by the OS, and transfers a drawing event to the OS for processing, to obtain a corresponding event response result. The drawing interface may be specifically an open graphics library (OpenGL).

In some embodiments, the plug-in code may initiate plug-in drawing by using the drawing interface provided by the parent application, to enable implementation of plug-in code in child applications to be simpler and more light weighted (e.g., less code needed to be developed for the plug-in code in child applications/applets).

In an embodiment, step S312 includes: invoking, by executing the plug-in code, a drawing interface provided by an OS providing a running environment to the parent application to draw the picture on the session interface corresponding to the session message. In some embodiments, the plug-in code that is run directly invokes the drawing interface provided by the OS to perform plug-in drawing, to enable plug-in code implementation of the child application to be more light weighted.

In an embodiment, after step S310, the message processing method further includes: obtaining, by executing the plug-in code, text content corresponding to the child application identifier. Step S312 includes: splicing/joining/integrating and displaying, on the session interface corresponding to the session message, the text content and the picture that is dynamically drawn according to the shared data.

The text content is content that is in a text form and that the child application wants to share together when sharing is performed. For example, the text content is a subject name or a description text.

In an embodiment, the terminal may directly obtain, by using a plug-in code that is run, text content corresponding to a child application identifier. The text content corresponding to the child application identifier may be specifically a name, a version number, other description information, or the like of a child application. After obtaining shared data and the text content, the terminal may integrate and display, as a message, the text content and a picture that is dynamically drawn based on the shared data.

In an embodiment, the terminal may extract, from a received session message by using a plug-in code that is run, text content corresponding to a child application identifier. The text content that corresponds to the child application identifier and that is included in the session message may be text content that is related to the child application and that is directly obtained by using a parent application by a first terminal initiating the session message, or may be text content that is obtained by the first terminal and that is entered by a user.

In an embodiment, integrating of text content and a picture that is dynamically drawn according to shared data may be specifically performed in a left-right integration manner or an up-down integration manner. There may be a plurality of pieces of text content, and the plurality of pieces of text content may be integrated with the picture that is dynamically drawn according to the shared data, in an up-middle-down integration manner, in a left-middle-right integration manner, in a manner of first left-right integrating and then up-down integrating, in a manner of first up-down integrating and then left-right integrating, or the like. The text content and the picture that is dynamically drawn according to the shared data may be integrated into a new picture, or may exist separately and be visually integrated into a whole.

In an embodiment, components to which plug-in structure code included in plug-in code that is run points includes a component for presenting a picture dynamically drawn according to shared data and a component for displaying text content. The component for presenting the picture dynamically drawn according to the shared data and the component for displaying the text content may be components having a same height, so that the two components may perform displaying after left-right integrating. The component for presenting the picture dynamically drawn according to the shared data and the component for displaying the text content may be components having a same width, so that the two components may perform displaying after up-down integrating.

In the foregoing embodiment, the shared data and the corresponding text content can be shared together by using the parent application, increasing an amount of information transferred by a sharing behavior.

Figure 6:
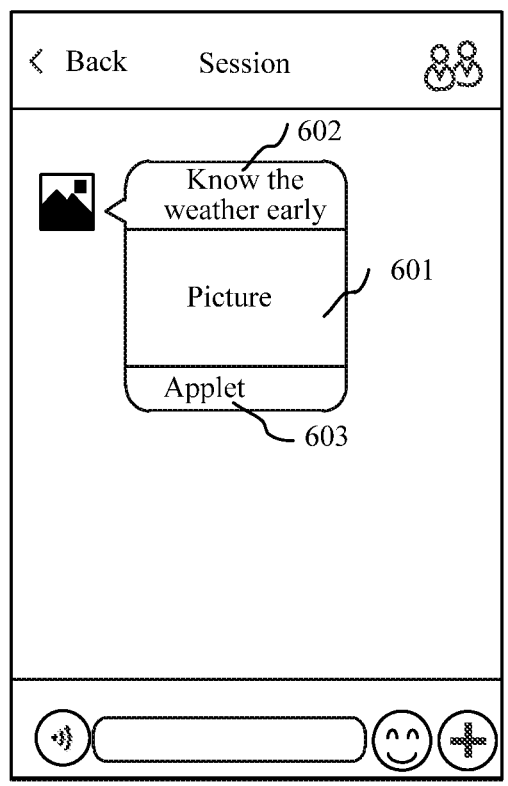
FIG. 6 is a schematic interface diagram of a session interface corresponding to a session message according to an embodiment.

FIG. 6 is a schematic interface diagram of a session interface corresponding to a session message according to an embodiment. Referring to FIG. 6, the interface includes a picture 601 dynamically drawn according to shared data, first text content 602, and second text content 603. After obtaining text content and shared data, a terminal integrates the text content and the shared data successively in an up-middle-down integration manner according to the picture 601 dynamically drawn according to shared data, the first text content 602, and the second text content 603, and display the text content and the shared data on the session interface corresponding to the session message.

In an embodiment, step S310 includes: periodically obtaining, by executing the plug-in code, the shared data corresponding to the child application identifier. Step S312 includes: in response to the shared data being obtained, drawing, according to the currently obtained shared data (latest obtained shared data), the picture on the session interface corresponding to the session message. In one example, the drawing operation may be triggered whenever an updated shared data is received/obtained. In another example, when the session is opened (e.g., a session interface is triggered and presented, and the session may include multiple messages based on a conversation history of the users, as a user scrolls/navigates at the session interface to view the multiple messages, the session message may become visible in the session interface, and the shared data may be obtained to draw the picture to reflect the latest change by then. That is, when the session message needs to be rendered based on user operation, the terminal may update the drawing of the picture according to the shared data. In addition, as the current user screen continues to show the session message for a certain time period, the picture may be drawn again based on updated shared data.

Specifically, the terminal may first determine, by executing the plug-in code, a period that the shared data corresponding to the child application identifier changes with time, and then set, according to the determine change period, a time period of obtaining the shared data corresponding to the child application identifier. Then, the terminal periodically obtains, according to the set period by executing the plug-in code, the shared data corresponding to the child application identifier. The change period is a period in which the shared data changes, for example, 10 minutes or one hour. The time period is a period of obtaining the shared data, for example, 10 minutes or one hour.

In an embodiment, when obtaining shared data, the terminal may draw, according to currently obtained shared data, a picture on a session interface corresponding to a session message. For example, it is assumed that the picture drawn according to the shared data is a real-time indoor temperature graph. An indoor temperature is data that changes with time. When periodically obtaining the indoor temperature, the terminal obtains an indoor temperature of a current moment, and draws an indoor temperature graph of the current moment.

In an embodiment, when obtaining shared data, the terminal may alternatively draw, according to currently obtained shared data and previously obtained shared data, a picture on a session interface corresponding to a session message. For example, it is assumed that the picture drawn according to the shared data is a stock price change tendency graph of a stock. A stock price of a stock is data that changes with time. When periodically obtaining the stock price of the stock, the terminal obtains only a stock price of the stock of a current moment, and draws a stock price change tendency graph of the stock with reference to a previously obtained stock price of the stock.

In the foregoing embodiment, the shared data is periodically obtained, and the picture drawn on the session interface corresponding to the session message is updated in real time, ensuring real-time performance of the shared data.

Figure 7:
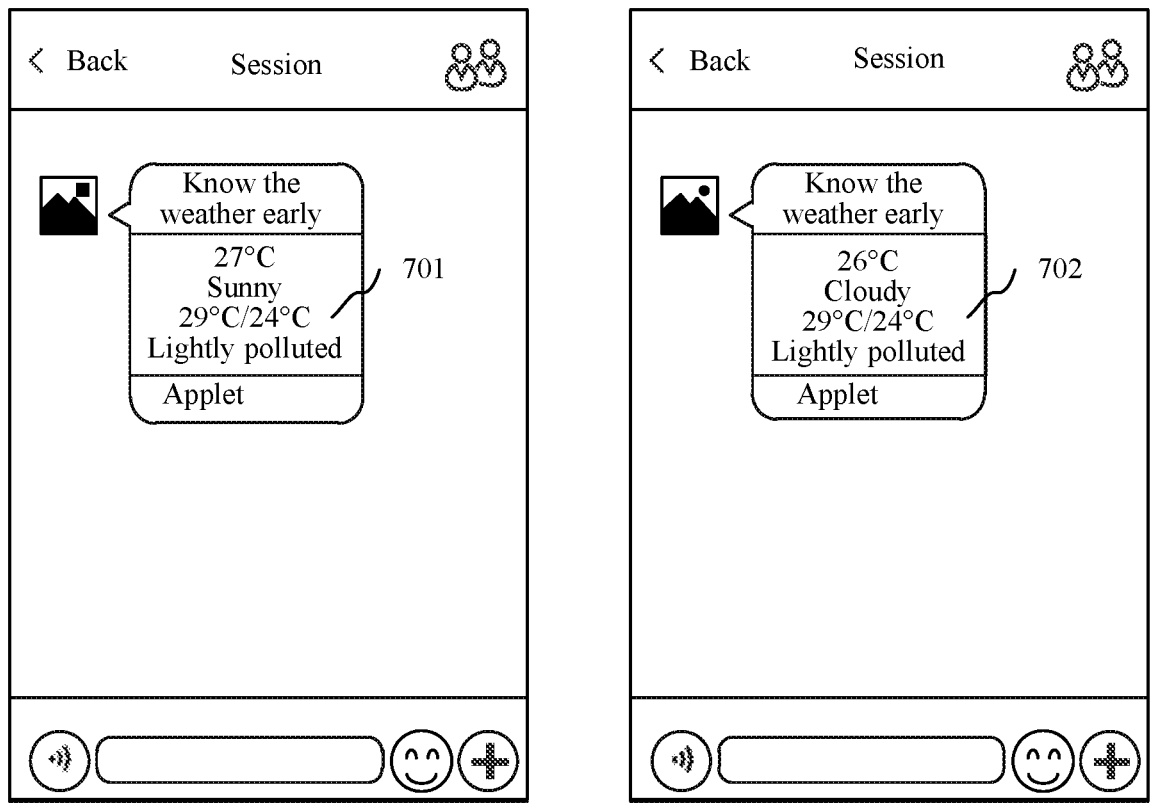
FIG. 7 is a schematic interface diagram of a session interface corresponding to a session message according to another embodiment.

FIG. 7 is a schematic interface diagram of a session interface corresponding to a session message according to an embodiment. Referring to the left figure in FIG. 7, a picture 701 dynamically drawn on the interface according to shared data is a picture that is drawn, according to previously obtained shared data when the shared data is obtained at a previous time point, on the session interface corresponding to the session message. Referring to the right figure in FIG. 7, a picture 702 dynamically drawn on the interface according to shared data is a picture that is drawn, according to later obtained shared data when the shared data is obtained at a later time point, on the session interface corresponding to the session message. For example, the left figure in FIG. 7 may illustrate a session interface at 3 PM to reflect the weather at 3 PM, and the right figure in FIG. 7 may illustrate a session interface at 4 PM to reflect the weather updated at 4 PM.

Figure 8:
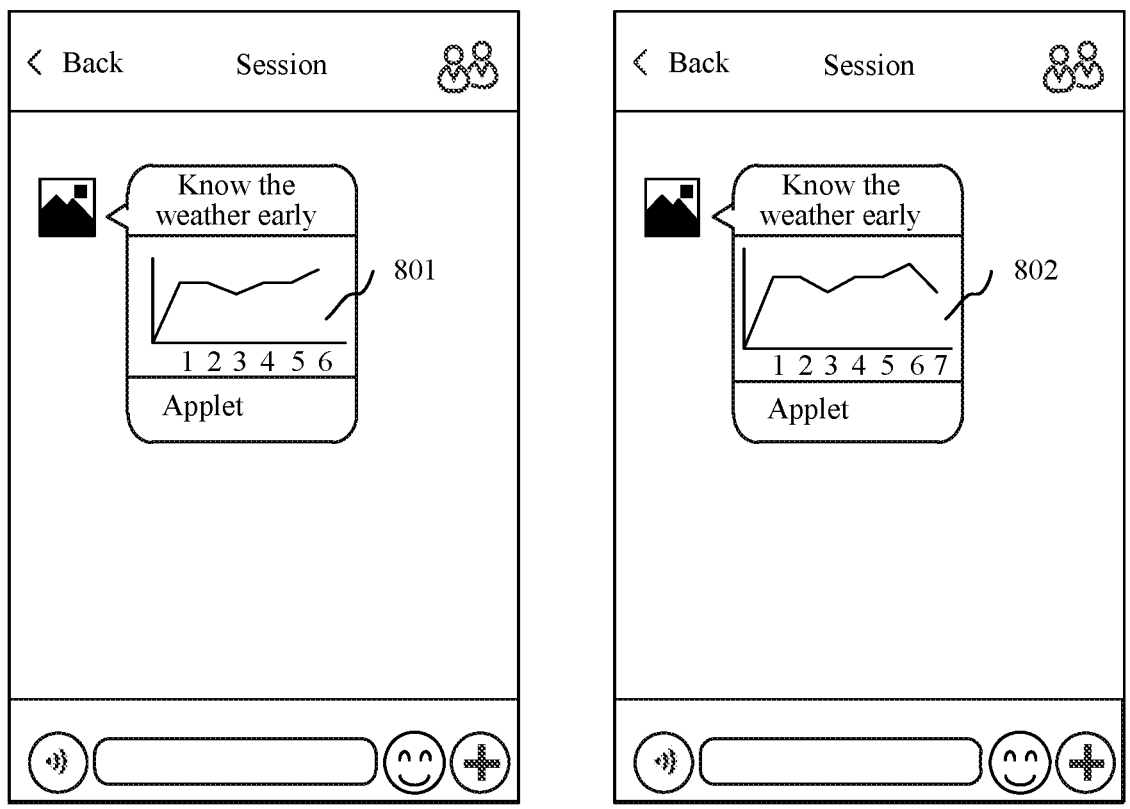
FIG. 8 is a schematic interface diagram of a session interface corresponding to a session message according to still another embodiment.

FIG. 8 is a schematic interface diagram of a session interface corresponding to a session message according to an embodiment. Referring to the left figure in FIG. 8, a picture 801 dynamically drawn on the interface according to shared data is a picture that is drawn, according to all obtained shared data when the shared data is obtained at a previous time point (e.g., temperature chart from Monday to Saturday), on the session interface corresponding to the session message. Referring to the right figure in FIG. 8, a picture 802 dynamically drawn on the interface according to shared data is a picture that is drawn, according to all obtained shared data when the shared data is obtained at a later time point (e.g., temperature chart from Monday to Sunday), on the session interface corresponding to the session message.

In an embodiment, the message processing method further includes: detecting a triggering operation performed on a picture; and running, according to the triggering operation, a child application corresponding to the child application identifier in an environment that is used for running the child application and that is provided by a parent application.

The triggering operation is an operation used for triggering running of the child application. The triggering operation is a touch operation, a click operation, a slide operation, or the like. Specifically, after dynamically drawing the picture, according to the shared data, on the session interface corresponding to the session message, the terminal detects the triggering operation performed on the picture. After detecting the triggering operation performed on the picture, the terminal triggers an instruction for running the child application corresponding to the child application identifier, and run, according to the instruction, the child application corresponding to the child application identifier in the environment that is used for running the child application and that is provided by the parent application.

In an embodiment, the user terminal may create a child application logical layer unit and a corresponding child application view layer unit by using a parent application; and load, by using the child application logical layer unit, a principal code bundle corresponding to a child application identifier, and instruct the child application view layer unit to perform rendering of a child application page. An environment in which the child application logical layer unit and the corresponding child application view layer unit created by using the parent application are run is an environment in which the child application corresponding to the child application identifier is run.

In an embodiment, in the message processing method, the step of running, according to the triggering operation, a child application corresponding to the child application identifier in an environment that is used for running the child application and that is provided by a parent application includes: obtaining, according to the triggering operation, page code corresponding to the child application identifier; selecting, according to the page code, a common component from a common component library provided by the parent application; and drawing the selected common component, to form a corresponding child application page.

Specifically, the terminal may obtain, by using the parent application, a principal code bundle corresponding to the child application identifier, and obtain the page code from the principal code bundle. The page code may include page logic code, page structure code, and page style code. The principal code bundle may be locally read, or may be downloaded from a server. The page structure code is code that defines page composition. The page structure code may include an identifier of a common component included on a page. The page style code is code that defines a page style. The page logic code is code that defines processing logic of a corresponding child application page.

Further, the terminal may execute the page structure code by using the child application view layer unit, and select, from a common component library according to the identifier of the common component defined in the executed page structure code, the common component corresponding to the identifier. The common component library is stored locally on the terminal, and the common component library may be loaded by using the child application view layer unit after the child application view layer unit is created. The selected common component is a common component that is defined in the page structure code and that is needed when the child application page is generated. The common component is a component shared by different child application pages, has a visual form, and is a composition unit of a child application page. The common component has a unique identifier that may be a name of the common component.

In an embodiment, the common component may be an icon, a text container, a progress bar, a form component, a navigation component, a media component, a map component, or a canvas component. The form component may include a button, a selection box, a form, a switch, and the like.

Further, the terminal may obtain, by using the child application view layer unit, default component style data provided with the selected common component, thereby organizing the selected common component according to the default component style data and performing rendering, to form a child application page.

In an embodiment, the terminal may obtain, by using the child application view layer unit, page style code in a principal code bundle of a child application, and draw a corresponding common component according to component style data corresponding to a selected common component in the page style code, to form a child application page.

In the foregoing embodiment, when the parent application is run, the child application page may be quickly constructed by using the common component provided by the parent application, reducing application installation duration, and improving application use efficiency.

In the foregoing embodiment, the child application is run in the environment that is used for running the child application and that is provided by the parent application, and no complex installation process is needed, improving the application use efficiency.

Figure 9:
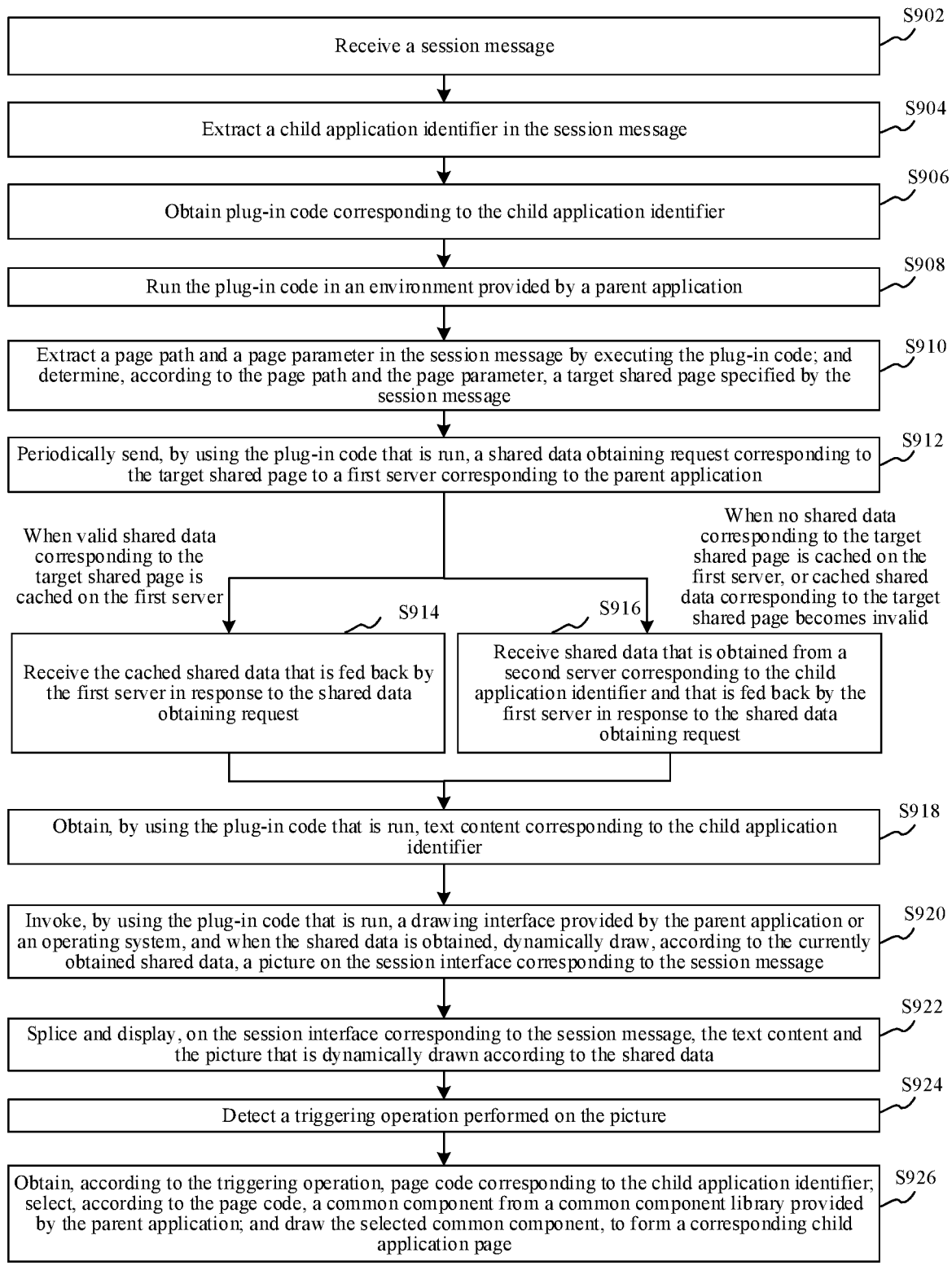
FIG. 9 is a schematic flowchart of a message processing method according to another embodiment.

As shown in FIG. 9, in a specific embodiment, a message processing method includes the following steps:

S902: Receive a session message.

S904: Extract a child application identifier in the session message.

S906: Obtain plug-in code corresponding to the child application identifier.

S908: Run the plug-in code in an environment provided by a parent application.

S910: Extract a page path and a page parameter in the session message by executing the plug-in code; and determine, according to the page path and the page parameter, a target shared page specified by the session message.

S912: Periodically send, by executing the plug-in code, a shared data obtaining request corresponding to the target shared page to a first server corresponding to the parent application.

S914: When valid shared data corresponding to the target shared page is cached on the first server, receive the cached shared data that is fed back by the first server in response to the shared data obtaining request.

S916: When no shared data corresponding to the target shared page is cached on the first server, or cached shared data corresponding to the target shared page becomes invalid, receive shared data that is obtained from a second server corresponding to the child application identifier and that is fed back by the first server in response to the shared data obtaining request.

S918: Obtain, by executing the plug-in code, text content corresponding to the child application identifier.

S920: Invoke, by executing the plug-in code, a drawing interface provided by the parent application or an OS, and when the shared data is obtained, dynamically draw, according to the currently obtained shared data, a picture on the session interface corresponding to the session message.

S922: Integrate and display, on the session interface corresponding to the session message, the text content and the picture that is dynamically drawn according to the shared data.

S924: Detect a triggering operation performed on the picture.

S926: Obtain, according to the triggering operation, page code corresponding to the child application identifier; select, according to the page code, a common component from a common component library provided by the parent application; and draw the selected common component, to form a corresponding child application page.

In some embodiments, the parent application is run on the OS, and then the parent application may receive the session message, obtain, according to the child application identifier included in the session message, the plug-in code corresponding to the corresponding child application, then run the plug-in code in the environment provided by the parent application, obtain, by executing the plug-in code, the shared data corresponding to the child application identifier, and dynamically draw, based on the shared data, the picture on the session interface corresponding to the session message, to complete a message processing process. In this way, when being run, the parent application may directly process a received message in the environment provided by the parent application, avoiding time consuming caused by switching to an application, targeted by the message, to perform message processing, and improving message processing efficiency.

Figure 10:
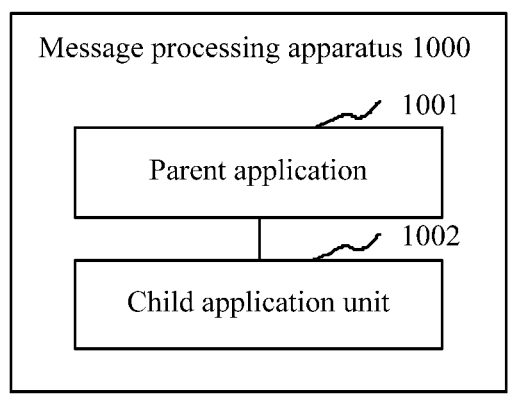
FIG. 10 is a structural block diagram of a message processing apparatus according to an embodiment.

As shown in FIG. 10, in an embodiment, a message processing apparatus 1000 is provided. Referring to FIG. 10, the message processing apparatus 1000 includes a parent application 1001 and a child application unit 1002. The child application unit 1002 may include a child application view layer unit and a child application logical layer unit.

The parent application 1001 is configured to: receive a session message; extract a child application identifier in the session message; and obtain plug-in code corresponding to the child application identifier.

The child application unit 1002 is configured to: run the plug-in code in an environment provided by a parent application; obtain, by executing the plug-in code, shared data corresponding to the child application identifier; and dynamically draw, according to the shared data, a picture on a session interface corresponding to the session message.

According to the foregoing message processing apparatus 1000, the parent application is run on an OS, and then the parent application may receive the session message, obtain, according to the child application identifier included in the session message, the plug-in code corresponding to the corresponding child application, then run the plug-in code in the environment provided by the parent application, obtain, by executing the plug-in code, the shared data corresponding to the child application identifier, and dynamically draw, based on the shared data, the picture on the session interface corresponding to the session message, to complete a message processing process. In this way, when being run, the parent application may directly process a received message in the environment provided by the parent application, avoiding time consuming caused by switching to an application, targeted by the message, to perform message processing, and improving message processing efficiency.

In an embodiment, the child application unit 1002 is further configured to: send, by executing the plug-in code, a shared data obtaining request corresponding to the child application identifier to a first server corresponding to the parent application; and receive the shared data that corresponds to the child application identifier and that is fed back by the first server in response to the shared data obtaining request.

In some embodiments, when the shared data corresponding to the child application identifier needs to be obtained, the first server corresponding to the parent application is used as transition, the shared data obtaining request is sent to the first server, and the first server responds to the request, avoiding that the second server corresponding to the child application identifier simultaneously receives a large quantity of shared data obtaining requests, causing a problem that responding is incorrect or responding cannot be performed.

In an embodiment, the child application unit 1002 is further configured to: when valid shared data corresponding to the child application identifier is cached on the first server, receive the cached shared data that is fed back by the first server in response to the shared data obtaining request; or when no shared data corresponding to the child application identifier is cached on the first server, or cached shared data corresponding to the child application identifier becomes invalid, receive shared data that is obtained from a second server corresponding to the child application identifier and that is fed back by the first server in response to the shared data obtaining request.

In some embodiments, the shared data is cached by using the first server corresponding to the parent application. When needing to obtain the shared data corresponding to the child application identifier, the terminal may directly obtain the cached data to perform feedback, avoiding resource waste caused by frequent requests for same data. In addition, validity determining is set for the cached shared data, ensuring time validity of the cached shared data.

In an embodiment, the child application unit 1002 is further configured to: determine, by executing the plug-in code, a target shared page specified by the session message, where the target shared page belongs to a child application corresponding to the child application identifier; and obtain, by executing the plug-in code, shared data corresponding to the target shared page.

In some embodiments, the page belonging to the child application may be shared, improving diversity and flexibility of content to be shared.

In an embodiment, the child application unit 1002 is further configured to: extract a page path and a page parameter in the session message by executing the plug-in code; and determine, according to the page path and the page parameter, a target shared page specified by the session message.

In some embodiments, the target shared page needing to be shared may be accurately located by adding the page path and the page parameter to the session message, to accurately share content intended to be shared.

In an embodiment, the child application unit 1002 is further configured to: invoke, by executing the plug-in code, a drawing interface provided by the parent application, and dynamically draw, according to the shared data, the picture on the session interface corresponding to the session message; or invoke, by executing the plug-in code, a drawing interface provided by an OS providing a running environment to the parent application, and dynamically draw, according to the shared data, the picture on the session interface corresponding to the session message.

In some embodiments, the plug-in code that is run performs plug-in drawing by using the drawing interface provided by the parent application or the drawing interface provided by the OS, to enable plug-in code implementation of the child application to be more light weighted.

In an embodiment, the child application unit 1002 is further configured to: obtain, by executing the plug-in code, text content corresponding to the child application identifier; and integrate and display, on the session interface corresponding to the session message, the text content and the picture that is dynamically drawn according to the shared data.

In some embodiments, the shared data and the corresponding text content can be shared together by using the parent application, increasing an amount of information transferred by a sharing behavior.

In an embodiment, the child application unit 1002 is further configured to: periodically obtain, by executing the plug-in code, the shared data corresponding to the child application identifier; and when obtaining the shared data, draw, according to the currently obtained shared data, the picture on the session interface corresponding to the session message.

In some embodiments, the shared data is periodically obtained, and the picture drawn on the session interface corresponding to the session message is updated in real time, ensuring real-time performance of the shared data.

In an embodiment, the child application unit 1002 is further configured to: detect a triggering operation performed on a picture; and run, according to the triggering operation, the child application corresponding to the child application identifier in an environment that is used for running the child application and that is provided by the parent application.

In some embodiments, the child application is run in the environment that is used for running the child application and that is provided by the parent application, and no complex installation process is needed, improving the application use efficiency.

In an embodiment, the child application unit 1002 is further configured to: obtain, according to the triggering operation, page code corresponding to the child application identifier; and select, according to the page code, a common component from a common component library provided by the parent application; and draw the selected common component, to form a corresponding child application page.

In some embodiments, when the parent application is run, the child application page may be quickly constructed by using the common component provided by the parent application, reducing application installation duration, and improving application use efficiency.

In an embodiment, a computer device is provided, and includes a memory and a processor. The memory stores computer readable instructions, and the computer readable instructions, when executed by the processor, cause the processor to perform the following steps: receiving a session message by using a parent application; extracting a child application identifier in the session message; obtaining plug-in code corresponding to the child application identifier; running the plug-in code in an environment provided by a parent application; obtaining, by executing the plug-in code, shared data corresponding to the child application identifier; and dynamically drawing, according to the shared data, a picture on a session interface corresponding to the session message.

In an embodiment, the obtaining, by executing the plug-in code, shared data corresponding to the child application identifier includes: sending, by executing the plug-in code, a shared data obtaining request corresponding to the child application identifier to a first server corresponding to the parent application; and receiving the shared data that corresponds to the child application identifier and that is fed back by the first server in response to the shared data obtaining request.

In an embodiment, the receiving the shared data that corresponds to the child application identifier and that is fed back by the first server in response to the shared data obtaining request includes: when valid shared data corresponding to the child application identifier is cached on the first server, receiving the cached shared data that is fed back by the first server in response to the shared data obtaining request; or when no shared data corresponding to the child application identifier is cached on the first server, or cached shared data corresponding to the child application identifier becomes invalid, receiving shared data that is obtained from a second server corresponding to the child application identifier and that is fed back by the first server in response to the shared data obtaining request.

In an embodiment, the obtaining, by executing the plug-in code, shared data corresponding to the child application identifier includes: determining, by executing the plug-in code, a target shared page specified by the session message, where the target shared page belongs to a child application corresponding to the child application identifier; and obtaining, by executing the plug-in code, shared data corresponding to the target shared page.

In an embodiment, the determining, by executing the plug-in code, a target shared page specified by the session message includes: extracting a page path and a page parameter in the session message by executing the plug-in code; and determining, according to the page path and the page parameter, the target shared page specified by the session message.

In an embodiment, the dynamically drawing, according to the shared data, a picture on a session interface corresponding to the session message includes: invoking, by executing the plug-in code, a drawing interface provided by the parent application, and dynamically drawing, according to the shared data, the picture on the session interface corresponding to the session message; or invoking, by executing the plug-in code, a drawing interface provided by an OS providing a running environment to the parent application, and dynamically drawing, according to the shared data, the picture on the session interface corresponding to the session message.

In an embodiment, the computer readable instructions cause the processor to perform the following step after obtaining, by executing the plug-in code, shared data corresponding to the child application identifier: obtaining, by executing the plug-in code, text content corresponding to the child application identifier. The dynamically drawing, according to the shared data, a picture on a session interface corresponding to the session message includes: integrating and displaying, on the session interface corresponding to the session message, the text content and the picture that is dynamically drawn according to the shared data.

In an embodiment, the obtaining, by executing the plug-in code, shared data corresponding to the child application identifier includes: periodically obtaining, by executing the plug-in code, the shared data corresponding to the child application identifier. The dynamically drawing, according to the shared data, a picture on a session interface corresponding to the session message includes: when obtaining the shared data, drawing, according to the currently obtained shared data, the picture on the session interface corresponding to the session message.

In an embodiment, the computer readable instructions cause the processor to further perform the following steps: detecting a triggering operation performed on a picture; and running, according to the triggering operation, the child application corresponding to the child application identifier in an environment that is used for running the child application and that is provided by the parent application.

In an embodiment, the running, according to the triggering operation, a child application corresponding to the child application identifier in an environment that is used for running the child application and that is provided by a parent application includes: obtaining, according to the triggering operation, page code corresponding to the child application identifier; selecting, according to the page code, a common component from a common component library provided by the parent application; and drawing the selected common component, to form a corresponding child application page.

According to the foregoing computer device, the parent application is run on the OS, and then the parent application may receive the session message, obtain, according to the child application identifier included in the session message, the plug-in code corresponding to the corresponding child application, then run the plug-in code in the environment provided by the parent application, obtain, by executing the plug-in code, the shared data corresponding to the child application identifier, and dynamically draw, based on the shared data, the picture on the session interface corresponding to the session message, to complete a message processing process. In this way, when being run, the parent application may directly process a received message in the environment provided by the parent application, avoiding time consuming caused by switching to an application, targeted by the message, to perform message processing, and improving message processing efficiency.

In an embodiment, one or more computer readable storage mediums storing computer readable instructions are provided, and the computer readable instructions, when executed by one or more processors, cause the one or more processors to perform the following steps: receiving a session message by using a parent application; extracting a child application identifier in the session message; obtaining plug-in code corresponding to the child application identifier; running the plug-in code in an environment provided by a parent application; obtaining, by executing the plug-in code, shared data corresponding to the child application identifier; and dynamically drawing, according to the shared data, a picture on a session interface corresponding to the session message.

In an embodiment, the obtaining, by executing the plug-in code, shared data corresponding to the child application identifier includes: sending, by executing the plug-in code, a shared data obtaining request corresponding to the child application identifier to a first server corresponding to the parent application; and receiving the shared data that corresponds to the child application identifier and that is fed back by the first server in response to the shared data obtaining request.

In an embodiment, the receiving the shared data that corresponds to the child application identifier and that is fed back by the first server in response to the shared data obtaining request includes: when valid shared data corresponding to the child application identifier is cached on the first server, receiving the cached shared data that is fed back by the first server in response to the shared data obtaining request; or when no shared data corresponding to the child application identifier is cached on the first server, or cached shared data corresponding to the child application identifier becomes invalid, receiving shared data that is obtained from a second server corresponding to the child application identifier and that is fed back by the first server in response to the shared data obtaining request.

In an embodiment, the obtaining, by executing the plug-in code, shared data corresponding to the child application identifier includes: determining, by executing the plug-in code, a target shared page specified by the session message, where the target shared page belongs to a child application corresponding to the child application identifier; and obtaining, by executing the plug-in code, shared data corresponding to the target shared page.

In an embodiment, the determining, by executing the plug-in code, a target shared page specified by the session message includes: extracting a page path and a page parameter in the session message by executing the plug-in code; and determining, according to the page path and the page parameter, the target shared page specified by the session message.

In an embodiment, the dynamically drawing, according to the shared data, a picture on a session interface corresponding to the session message includes: invoking, by executing the plug-in code, a drawing interface provided by the parent application, and dynamically drawing, according to the shared data, the picture on the session interface corresponding to the session message; or invoking, by executing the plug-in code, a drawing interface provided by an OS providing a running environment to the parent application, and dynamically drawing, according to the shared data, the picture on the session interface corresponding to the session message.

In an embodiment, the computer readable instructions cause the processor to perform the following step after obtaining, by executing the plug-in code, shared data corresponding to the child application identifier: obtaining, by executing the plug-in code, text content corresponding to the child application identifier. The dynamically drawing, according to the shared data, a picture on a session interface corresponding to the session message includes: integrating and displaying, on the session interface corresponding to the session message, the text content and the picture that is dynamically drawn according to the shared data.

In an embodiment, the obtaining, by executing the plug-in code, shared data corresponding to the child application identifier includes: periodically obtaining, by executing the plug-in code, the shared data corresponding to the child application identifier. The dynamically drawing, according to the shared data, a picture on a session interface corresponding to the session message includes: when obtaining the shared data, drawing, according to the currently obtained shared data, the picture on the session interface corresponding to the session message.

In an embodiment, the computer readable instructions cause the processor to further perform the following steps: detecting a triggering operation performed on a picture; and running, according to the triggering operation, the child application corresponding to the child application identifier in an environment that is used for running the child application and that is provided by the parent application.

In an embodiment, the running, according to the triggering operation, a child application corresponding to the child application identifier in an environment that is used for running the child application and that is provided by a parent application includes: obtaining, according to the triggering operation, page code corresponding to the child application identifier; selecting, according to the page code, a common component from a common component library provided by the parent application; and drawing the selected common component, to form a corresponding child application page.

According to the foregoing storage medium, the parent application is run on the OS, and then the parent application may receive the session message, obtain, according to the child application identifier included in the session message, the plug-in code corresponding to the corresponding child application, then run the plug-in code in the environment provided by the parent application, obtain, by executing the plug-in code, the shared data corresponding to the child application identifier, and dynamically draw, based on the shared data, the picture on the session interface corresponding to the session message, to complete a message processing process. In this way, when being run, the parent application may directly process a received message in the environment provided by the parent application, avoiding time consuming caused by switching to an application, targeted by the message, to perform message processing, and improving message processing efficiency.

All or some of the processes of the methods in the foregoing embodiments may be implemented by a computer program instructing relevant hardware. The program may be stored in a non-volatile computer readable storage medium. When the program is run, the processes of the foregoing methods in the embodiments are performed. The storage medium may be a magnetic disk, an optical disc, a read-only memory (ROM), or the like.

The technical features of the foregoing embodiments may be randomly combined. For the purpose of concise descriptions, not all possible combinations of the technical features in the foregoing embodiments are described, but as long as combinations of the technical features do not conflict each other, the combinations of the technical features should be considered as falling within the scope of this specification.

The foregoing embodiments show only several implementations of this application, and descriptions thereof are in detail, but shall not be understood as limiting the patent scope of this application. It should be noted that various changes and improvements may further be made by a person of ordinary skill in the art without departing from the idea of this application, and these changes and improvements all fall within the protection scope of this application. Therefore, the protection scope of this application shall be subject to the appended claims.

What is claimed is:

1. A message processing method, applied to a computing device that executes a parent application, comprising:
   receiving a session message in a user interactive session;
   extracting a child application identifier in the session message;
   in response to receiving the session message, obtaining plug-in code corresponding to the child application identifier from an external source;
   executing the plug-in code in an environment provided by the parent application;
   sending, by executing the plug-in code, a shared data obtaining request corresponding to the child application identifier to a first server corresponding to the parent application;
   obtaining shared data corresponding to the child application identifier returned from the first server in response to the shared data obtaining request;
   drawing, according to the shared data, a first picture on a session interface corresponding to the session message at a first time point; and
   drawing, according to the shared data, a second picture on the session interface at a second time point later in time than the first time point.

2. The method according to claim 1, wherein the receiving the shared data corresponding to the child application identifier comprises:
   when valid shared data corresponding to the child application identifier is cached on the first server, receiving the cached shared data from the first server in response to the shared data obtaining request as the shared data corresponding to the child application identifier; and
   when no shared data corresponding to the child application identifier is cached on the first server, or when the cached shared data corresponding to the child application identifier becomes invalid, receiving the shared data corresponding to the child application identifier obtained by the first server from a second server corresponding to the child application identifier in response to the shared data obtaining request.

3. The method according to claim 1, wherein the obtaining, by executing the plug-in code, shared data corresponding to the child application identifier comprises:
   determining, by executing the plug-in code, a target shared page specified by the session message, wherein the target shared page belongs to a child application corresponding to the child application identifier; and
   obtaining, by executing the plug-in code, shared data corresponding to the target shared page as the shared data corresponding to the child application identifier.

4. The method according to claim 3, wherein the determining, by executing the plug-in code, a target shared page specified by the session message comprises:
   extracting a page path and a page parameter in the session message by executing the plug-in code; and
   determining, according to the page path and the page parameter, the target shared page specified by the session message.

5. The method according to claim 1, wherein the drawing, according to the shared data, a picture on a session interface corresponding to the session message comprises:
   invoking, by executing the plug-in code, a drawing interface provided by the parent application to draw the picture on the session interface corresponding to the session message; or
   invoking, by executing the plug-in code, a drawing interface provided by an operating system providing a running environment to the parent application to draw the picture on the session interface corresponding to the session message.

6. The method according to claim 1, wherein after the obtaining, by executing the plug-in code, shared data corresponding to the child application identifier, the method further comprises:
   obtaining, by executing the plug-in code, text content corresponding to the child application identifier; and the drawing, according to the shared data, a picture on a session interface corresponding to the session message comprises:
   integrating and displaying, on the session interface corresponding to the session message, the text content and the picture that is drawn according to the shared data.

7. The method according to claim 1, wherein the obtaining, by executing the plug-in code, shared data corresponding to the child application identifier comprises:
   periodically obtaining, by executing the plug-in code, the shared data corresponding to the child application identifier; and the drawing, according to the shared data, a picture on a session interface corresponding to the session message comprises:
   in response to the shared data being obtained, drawing, according to the latest obtained shared data, the picture on the session interface corresponding to the session message.

8. The method according to claim 1, wherein the method further comprises:
   detecting a triggering operation performed on the picture; and
   running, according to the triggering operation, the child application corresponding to the child application identifier in an environment provided by the parent application for running the child application.

9. The method according to claim 8, wherein the running, according to the triggering operation, the child application corresponding to the child application identifier comprises:
   obtaining, according to the triggering operation, page code corresponding to the child application identifier;
   selecting, according to the page code, a common component from a common component library provided by the parent application; and
   drawing the selected common component, to form a corresponding child application page.

10. The method according to claim 1, further comprising:
    presenting, on the session interface, the picture between a first text content and a second text content.

11. The method according to claim 1, wherein the user interactive session is a conversation, a dialogue, or a chat session.

12. A message processing apparatus, comprising a processor and a memory, the memory storing computer readable instructions, and the computer readable instructions being executed by the processor to perform:
    receiving a session message in a user interactive session;
    extracting a child application identifier in the session message;
    in response to receiving the session message, obtaining plug-in code corresponding to the child application identifier from an external source;
    executing the plug-in code in an environment provided by a parent application;
    sending, by executing the plug-in code, a shared data obtaining request corresponding to the child application identifier to a first server corresponding to the parent application;
    obtaining shared data corresponding to the child application identifier returned from the first server in response to the shared data obtaining request; and
    drawing, according to the shared data, a first picture on a session interface corresponding to the session message at a first time point; and
    drawing, according to the shared data, a second picture on the session interface at a second time point later in time than the first time point.

13. The apparatus according to claim 12, wherein the receiving the shared data corresponding to the child application identifier comprises:
    when valid shared data corresponding to the child application identifier is cached on the first server, receiving the cached shared data from the first server in response to the shared data obtaining request as the shared data corresponding to the child application identifier; and
    when no shared data corresponding to the child application identifier is cached on the first server, or when the cached shared data corresponding to the child application identifier becomes invalid, receiving the shared data obtained by the first server from a second server corresponding to the child application identifier in response to the shared data obtaining request.

14. The apparatus according to claim 12, wherein the obtaining, by executing the plug-in code, shared data corresponding to the child application identifier comprises:
    determining, by executing the plug-in code, a target shared page specified by the session message, wherein the target shared page belongs to a child application corresponding to the child application identifier; and
    obtaining, by executing the plug-in code, shared data corresponding to the target shared page as the shared data corresponding to the child application identifier.

15. The apparatus according to claim 14, wherein the determining, by executing the plug-in code, a target shared page specified by the session message comprises:

extracting a page path and a page parameter in the session message by executing the plug-in code; and determining, according to the page path and the page parameter, the target shared page specified by the session message.

16. The apparatus according to claim 12, wherein the drawing, according to the shared data, a picture on a session interface corresponding to the session message comprises:

invoking, by executing the plug-in code, a drawing interface provided by the parent application to draw the picture on the session interface corresponding to the session message; or invoking, by executing the plug-in code, a drawing interface provided by an operating system providing a running environment to the parent application to draw the picture on the session interface corresponding to the session message.

17. The apparatus according to claim 12, wherein after the obtaining, by executing the plug-in code, shared data corresponding to the child application identifier, the computer readable instructions are further executed by the processor to perform the following operation:

obtaining, by executing the plug-in code, text content corresponding to the child application identifier; and the drawing, according to the shared data, a picture on a session interface corresponding to the session message comprises:

integrating and displaying, on the session interface corresponding to the session message, the text content and the picture that is drawn according to the shared data.

18. The apparatus according to claim 12, wherein the obtaining, by executing the plug-in code, shared data corresponding to the child application identifier comprises:

periodically obtaining, by executing the plug-in code, the shared data corresponding to the child application identifier; and the drawing, according to the shared data, a picture on a session interface corresponding to the session message comprises:

in response to the shared data being obtained, drawing, according to the latest obtained shared data, the picture on the session interface corresponding to the session message.

19. The apparatus according to claim 12, wherein the computer readable instructions are further executed by the processor to perform the following operations:

detecting a triggering operation performed on the picture; and running, according to the triggering operation, the child application corresponding to the child application identifier in an environment provided by the parent application for running the child application.

20. A non-transitory computer-readable storage medium storing computer program instructions executable by at least one processor to perform:

receiving a session message in a user interactive session;

extracting a child application identifier in the session message;

in response to receiving the session message, obtaining plug-in code corresponding to the child application identifier from an external source;

executing the plug-in code in an environment provided by a parent application;

sending, by executing the plug-in code, a shared data obtaining request corresponding to the child application identifier to a first server corresponding to the parent application;

obtaining, shared data corresponding to the child application identifier returned from the first server in response to the shared data obtaining request; and drawing, according to the shared data, a first picture on a session interface corresponding to the session message at a first time point; and drawing, according to the shared data, a second picture on the session interface at a second time point later in time than the first time point.

\* \* \* \* \*